United States Patent
Lakshminarayanan et al.

(10) Patent No.: US 10,810,231 B2
(45) Date of Patent: Oct. 20, 2020

(54) DATA TRANSMISSION USING SMART CLUSTERS

(71) Applicant: Bank of America Corporation, Charlotte, NC (US)

(72) Inventors: Balamurali Lakshminarayanan, Chennai (IN); Mubashshir Ahmed Nazir Ahmed, Hyderabad (IN); Srinath Nelakuditi, Hyderabad (IN); Kalyan Chakravarthy Pallapolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 150 days.

(21) Appl. No.: 16/267,844

(22) Filed: Feb. 5, 2019

(65) Prior Publication Data

US 2020/0250204 A1  Aug. 6, 2020

(51) Int. Cl.
*G06F 16/30* (2019.01)
*G06F 16/27* (2019.01)
*G06F 16/182* (2019.01)
*G06F 16/11* (2019.01)
*G06F 16/907* (2019.01)
*G06F 16/22* (2019.01)

(52) U.S. Cl.
CPC .......... *G06F 16/278* (2019.01); *G06F 16/122* (2019.01); *G06F 16/182* (2019.01); *G06F 16/2228* (2019.01); *G06F 16/907* (2019.01)

(58) Field of Classification Search
CPC .... G06F 16/122; G06F 16/182; G06F 16/278; G06F 16/907; G06F 16/2228

USPC ....... 707/607, 609, 687, 705, 769, 790, 813, 707/821

See application file for complete search history.

(56) References Cited

U.S. PATENT DOCUMENTS

| | | | |
|---|---|---|---|
| 7,555,559 B2 | 5/2009 | Chapweski | |
| 7,721,288 B2 | 5/2010 | Wu et al. | |
| 8,954,529 B2 | 2/2015 | Xu et al. | |
| 9,489,394 B2 | 11/2016 | Kilpatrick et al. | |
| 9,824,094 B1 | 11/2017 | Meyer et al. | |
| 9,870,374 B2 | 1/2018 | Aguilera et al. | |
| 9,906,536 B1 | 2/2018 | Abraham | |
| 10,074,079 B2 * | 9/2018 | Kapoustin | G06F 16/2448 |
| 2009/0254971 A1 * | 10/2009 | Herz | G06Q 30/0603 726/1 |
| 2015/0039652 A1 * | 2/2015 | Kapoustin | G06F 16/2448 707/779 |
| 2016/0147471 A1 * | 5/2016 | O'Hare | G06F 3/067 713/171 |
| 2017/0278179 A1 * | 9/2017 | Perrier | G06Q 30/0643 |
| 2018/0253659 A1 | 9/2018 | Lee et al. | |
| 2019/0108360 A1 * | 4/2019 | Iyer | G06F 3/0685 |

* cited by examiner

*Primary Examiner* — Sana A Al-Hashemi
(74) *Attorney, Agent, or Firm* — Michael A. Springs

(57) ABSTRACT

A smart transmission system is configured to upload data from a plurality of sources to a target application hosted in a cloud environment. A server receives a data stream from the plurality of sources. Using a priority algorithm, the server analyzes the data stream to determine which files and accounts are most critical for the target application's function. The files and their associated accounts are partitioned into tranches, and the tranches are uploaded to the target application in order of priority.

20 Claims, 7 Drawing Sheets

| ACCOUNT SETTINGS 400 | | |
|---|---|---|
| | ACCOUNT ID: A33333 | ACCOUNT ID: A11111 |
| CUSTOMER TYPE 306 | CLIENT | SMALL BUSINESS |
| CUSTOMER CONTACT INFORMATION 308 | EMAIL | PHONE |
| CUSTOMER OPT-OUT CONSENT 310 | CALLABLE | CALLABLE |
| CUSTOMER RELATIONSHIP AGE 312 | 4 YEARS | 15 YEARS |

Account 502 (206, with brackets 302 and 314):

| ACCOUNT ID: A33333 | | | |
|---|---|---|---|
| FACTORS | TYPE | PRIORITY VALUE | % |
| SOURCE OF DATA 304 | TLP | 2 | 20% |
| CUSTOMER TYPE 306 | CLIENT | 3 | 30% |
| CUSTOMER RELATIONSHIP AGE 312 | 1-5 YEARS | 1 | 10% |
| FOLLOW-UP TASK DUE DATE 320 | OTHER | 4 | 40% |
| OVERALL | | 10 | 100% |

CUMULATIVE PRIORITY 506

GINI INDEX = $1 - 0.20^2 - 0.30^2 - 0.10^2 - 0.40^2$
= $1 - 0.04 - 0.09 - 0.01 - 0.16$
= 0.70

Account 504:

| ACCOUNT ID: A11111 | | | |
|---|---|---|---|
| FACTORS | TYPE | PRIORITY VALUE | % |
| SOURCE OF DATA 304 | GDPP | 1 | 11% |
| CUSTOMER TYPE 306 | SMALL BUSINESS | 2 | 22% |
| CUSTOMER RELATIONSHIP AGE 312 | 10-20 YEARS | 3 | 33% |
| FOLLOW-UP TASK DUE DATE 320 | 6-10 DAYS OLD | 3 | 33% |
| OVERALL | | 9 | 100% |

CUMULATIVE PRIORITY 508

GINI INDEX = $1 - 0.11^2 - 0.22^2 - 0.33^2 - 0.33^2$
= $1 - 0.01 - 0.04 - 0.10 - 0.10$
= 0.75

DATA TRANSMISSION USING SMART CLUSTERS

TECHNICAL FIELD

The present disclosure relates generally to data processing, and more specifically to data transmission using smart clusters.

BACKGROUND

Traditionally, software applications were hosted on local servers and individual user devices. Along with advances in cloud computing technology came a shift toward hosting applications on the cloud. For example, Software as a Service (SaaS) is a common method of implementing a variety of business applications, including payroll processing software, development software, database management system (DBMS) software, and customer relationship management (CRM) software. While centrally hosting a software application provides users with a flexible and cost-effective platform, the choice to centrally host software presents several technical challenges when users need to upload large quantities of data to the application.

The speed of any computation performed by the application is limited by the speed at which data inputs can be received by the application. Methods that deliver data to the application according to the order in which users upload their data slow an application's function by causing the cloud server to idle until it receives the data that is necessary for a given function. This idling time can be significant when the application must process several terabytes of data at a time from multiple different users. The resulting bottleneck limits the speed at which the system can receive additional data and it drastically reduces the speed at which an application can run on the cloud server.

SUMMARY

The system described in the present disclosure provides a technical solution to the technical problems discussed above by enabling a computing device to selectively deliver large quantities of data from a multitude of sources to an application hosted on a cloud server. The disclosed system provides several technical advantages, which include but are not limited to: 1) enabling computing devices to intelligently partition large data streams based on several static and dynamic factors and 2) cluster the partitioned data in tranches that permit an application hosted in the cloud to receive data essential for the application's execution. By implementing these techniques to intelligently transmit a data stream in ordered tranches, the present disclosure deters performance degradation and crashes that result from the bottlenecks caused by linear data uploads to applications hosted in the cloud. This improves the operational stability of cloud computing systems.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 4A-B illustrate the static and dynamic factors that are evaluated in the priority value assignment step shown in FIG. 2;

FIG. 5 illustrates the cumulative priority calculation step shown in FIG. 2 using a Customer Relationship Management application;

DETAILED DESCRIPTION

Figure 1:
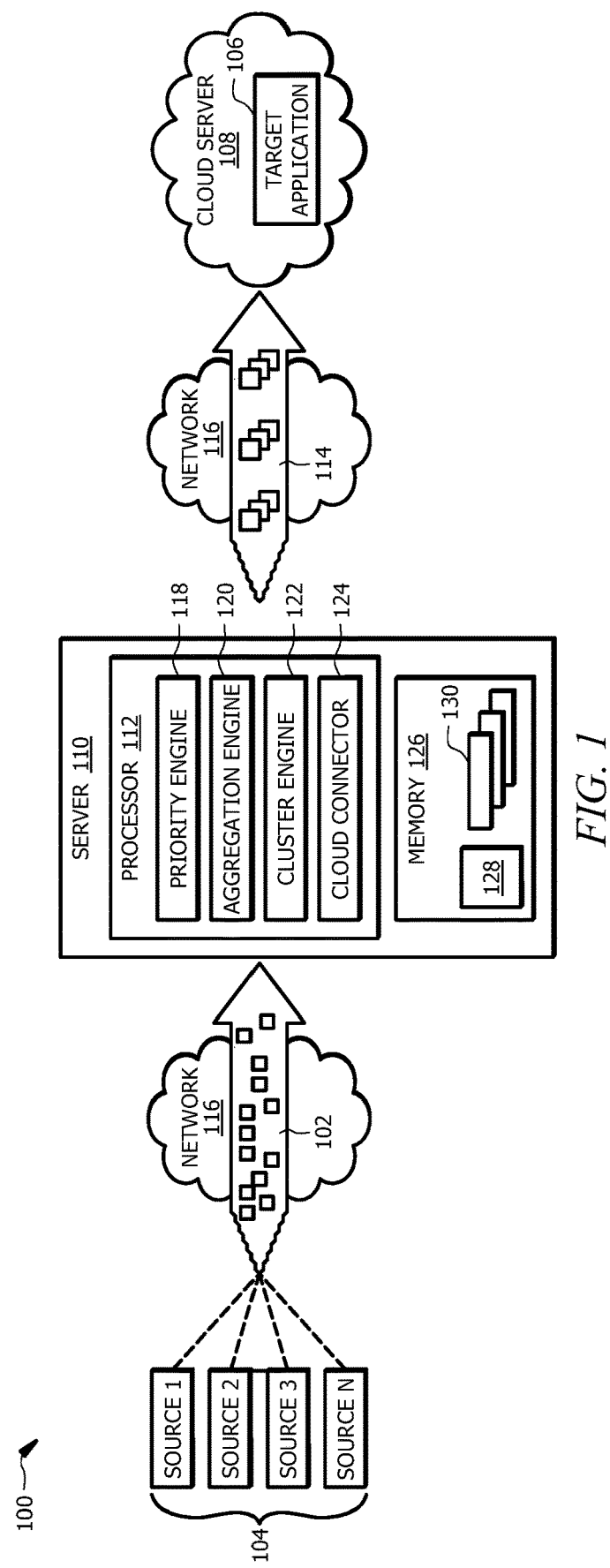
FIG. 1 illustrates a system for making data transmissions using smart clusters according to one embodiment of the present invention.

FIG. 1 illustrates one embodiment of smart transmission system 100 that is generally configured to facilitate the transfer of a data stream 102 from a plurality of sources 104 to a target application 106 located on a cloud server 108. This data upload is accomplished by server 110, which partitions the data stream 102 into data tranches 114.

Data Input

Server 110 is in signal communication with a plurality of sources 104. The plurality of sources 104 can range from a single source up to an Nth source. The number of sources 104 is only limited by the number of sources that can communicate with server 110 through network 116. The sources 104 are generally data processing systems comprising hardware and software that communicates with the other network elements over a network, such as the Internet, an intranet, an extranet, a private network, or any other medium or link. These data processing systems typically include one or more processors, an operating system, one or more applications, and one or more utilities. Applications running on the data processing systems provide native support for web protocols including, but not limited to, support for Hypertext Transfer Protocol (HTTP), Hypertext Markup Language (HTML), and Extensible Markup Language (XML), among others. Examples of sources 104 include, but are not limited to, desktop computers, mobile phones, tablet computers, and laptop computers.

Each of the plurality of sources 104 communicates with server 110 through network 116. Network 116 includes any suitable networks operable to support communication between components of smart transmission system 100. Network 116 may include any number and combination of wired and/or wireless communication channels capable of coupling together computing nodes. Network 116 may include any interconnecting system capable of transmitting audio, video, electrical signals, optical signals, data, messages, or any combination of the preceding. Network 116 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of smart transmission system 100. Network 116 may be configured to support any communication protocols as would be appreciated by one of ordinary skill in the art upon viewing this disclosure.

Cloud Server

Cloud server 108 is generally a network device configured to collect and store information linked with different users. For example, the cloud server 108 may be a server configured to operate as a software as a service (SaaS) server, a web server, a database, a file repository, a file hosting server, or any other suitable web-enabled server. The cloud server 108 is configured to host and/or is linked with one or more user accounts. Examples of accounts include, but are not limited to, online accounts, subscription services, social media accounts, product accounts, financial accounts, and/or any other suitable type of web-enabled accounts. Additionally, cloud server 108 is operably configured to host a target application 106. For example, in one embodiment, target application 106 can be a customer relationship management (CRM) application. It should be appreciated that many other applications can be implemented on a cloud platform such as cloud server 108. Cloud system 108 is in signal communication with the other components of smart transmission system 100 through network 116.

Smart Cluster Server

Server 110 includes a processor 112 that is operably configured to implement priority engine 118, aggregation engine 120, cluster engine 122, and cloud connector 124. Server 110 also includes a memory 126. The one or more processors are configured to process data and may be implemented in hardware or software. For example, the processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

Priority engine 118 is an application configured to analyze the data stream 102 and assign a series of priority values to data files received as part of the data stream 102. The priority values assigned by priority engine 118 are based on an evaluation of the types of data that are most important for the continued operation of target application 106. Priority engine 118 performs this analysis using one of several statistical methods. In one embodiment, priority engine 118 uses Classification and Regression Tree (CART) models to analyze a set of static and dynamic characteristics for each file.

Static factors are factors that indicate the data's significance to a given target application 106. For example, static factors may include an indication of the data's source. Priority engine 118 is configured to associate a set of files with a set of dynamic factors by reading the files' metadata and identifying a customer in the customer database to which the files are associated. Alternatively, priority engine 118 can read static factors that are embedded directly in the metadata of a file. Dynamic factors are metadata associated with the file that provide info on file usage and associated account updates. In the context of a CRM application, the info on file usage and associated account updates is an evaluation of customer behavior in response to some communication from the user as recorded in a file. Specifically, dynamic factors that might be considered include a file creation date or user comments, such as a task due date.

In addition to being able to analyze dynamic and static factors on a file-by-file basis, smart transmission system 100 can be configured to assign priority values on an account-by-account basis. For example, priority engine 118 can be configured to analyze all files associated with an account. The data analyzed for each factor may be contained in separate files linked to the account rather than all in the same file. Smart transmission system 100 can collect this info from the disparate files and assign an overall priority value for the account.

A user selects the dynamic and static factors for priority engine 118 to analyze based on the type of target application 106 to which the data stream 102 is directed. Users also define a number value for the different possible categories within each dynamic and static factor. A number value of 1 is assigned to the category within a dynamic or static factor that is least important for target application 106 to receive. Higher number values are given to those categories within a dynamic or static factor that indicate the file is more important for target application 106 to function. The function of priority engine 118 is discussed further with respect to FIGS. 2 and 3, below.

Aggregation engine 120 is an application configured to implement a priority algorithm that takes the priority values assigned by priority engine 118 and computes a cumulative priority value for each file. The cumulative priority value is an indication of a file's overall importance to the target application 106 given the priority values assigned to the static and dynamic factors. Depending on the type of target application 106, the dynamic and static factors can have varying significance for the target application 106. Aggregation engine 120 provides a means for comparing various dynamic and static factors across a large and varied data stream 102. The cumulative priority value can be calculated using any of several statistical methods. In one embodiment the calculation is made using a Gini Index. Further explanation of how to calculate a cumulative priority value is provided below in reference to FIGS. 2 and 4.

Cluster engine 122 is an application configured to cluster files into data tranches 114 based on the cumulative priority values calculated by aggregation engine 120. Files with the same cumulative priority value are grouped in tranches. Alternatively, if smart transmission system 100 is configured to analyze data stream 102 on an account-by-account basis, then cluster engine 122 establishes tranches of accounts based on the cumulative priority values given to the accounts. Cluster engine 122 is further configured to then identify the files in data stream 102 that are linked with a given account and to package those files in the data tranche 114 that includes that account.

In other embodiments the data tranches 114 may include files or accounts that don't have the same cumulative priority value but have similar cumulative priority values. Users of smart transmission system 100 can define a level of tolerance for grouping files and accounts into tranches. For example, a user might define a first tranche as comprising the ten files or accounts with the ten highest cumulative priority values, a second tranche as comprising the files with the following ten highest cumulative priority values, and so on. The user can select any number of rules for defining the data tranches 114 to suit the type of target application 106.

Cloud connector 124 is an application configured to link server 110 with cloud server 108 and to transfer the data tranches 114 to target application 106. Cloud connector 124 retrieves the tranches of data 114 stored in memory 126 starting with a tranche containing files or accounts with the highest cumulative priority value. The tranche of data 114 containing files or accounts with the next highest cumulative priority value are then retrieved from memory 126 and transferred to target application 106. This process continues until cloud connector 124 transfers the tranche of data 114 containing files or accounts with the lowest cumulative priority value to target application 106.

Figure 3:
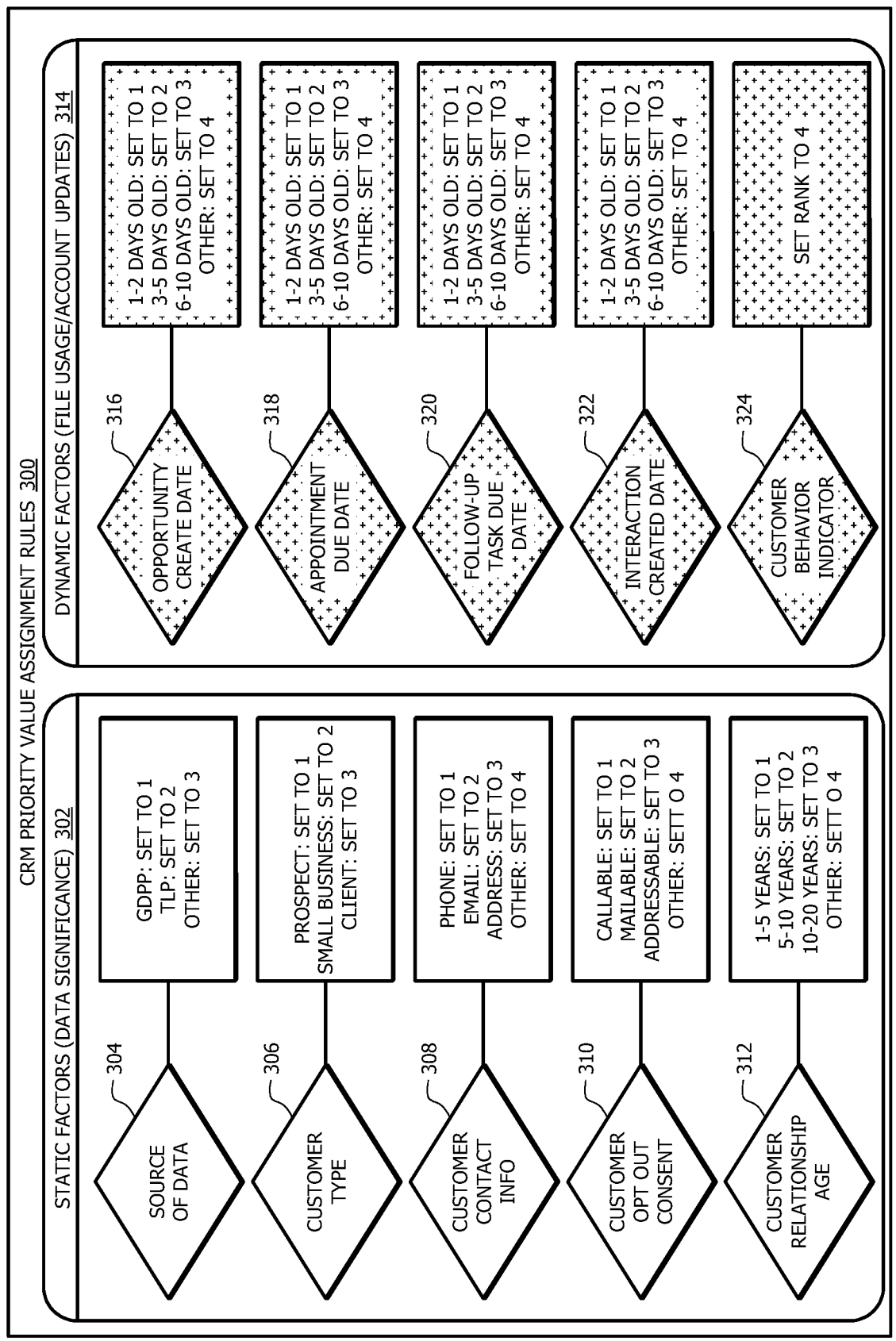
FIG. 3 illustrates the prioritization step shown in FIG. 2 using a Customer Relationship Management application.

Memory 126 is configured to store tranches while they await transmission to target application 106. Memory 126 is also configured to store a priority value assignment rules table 128 and a plurality of account settings 130. The account settings can include static factors related to a customer, including customer preferences for how they can be contacted, a customer type, and length of relationship with the customer. Additional details about priority value assignment rules table 128 and account settings 130, as depicted in FIGS. 3 and 4A, are provided in the discussion of system operations below.

Memory 126 represents any suitable combination of hardware and software configured to store data. The components of memory 126 may comprise volatile memory and/or non-volatile memory. A volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others. The term "memory medium" may mean a "memory device," a "memory," a "storage device," a "tangible computer readable storage medium," and/or a "computer-readable medium."

System Operation

Figure 2:
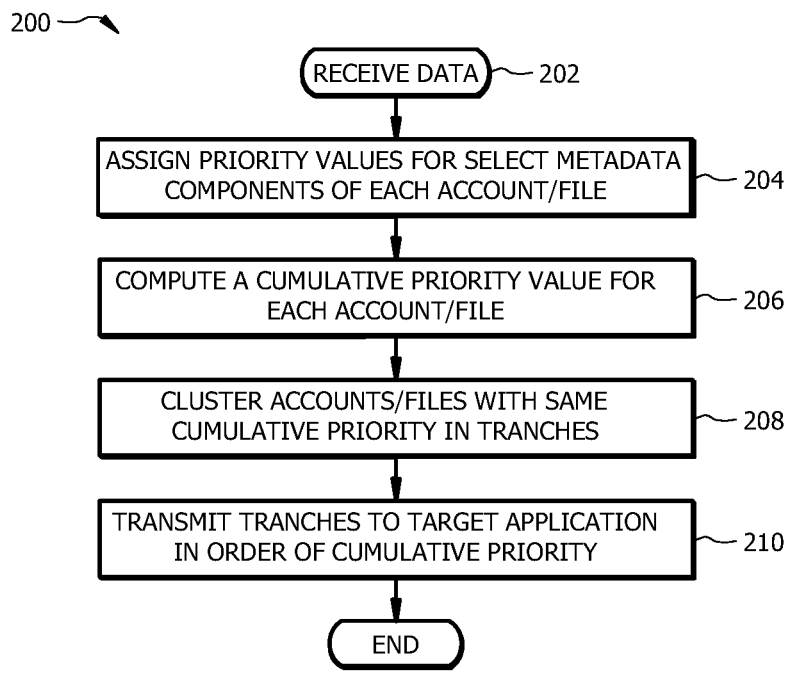
FIG. 2 is a flow chart showing a method of making data transmissions using smart clusters.

The following is a non-limiting overview of how the smart transmission system 100 operates. The flow chart in FIG. 2 presents an exemplary embodiment of method 200 of transferring a data stream 102 to a target application 106 using smart transmission engine 100. Individual steps in method 200 are illustrated using a CRM application as an exemplary target application 106.

At step 202, the smart transmission system 100 receives data at server 110. Data can be received in a data stream 102 that is composed of a plurality of files. The files may be of varying formats. Acceptable file formats include text files, video files, system related files, spreadsheet files, programming files, presentation files, internet files, image files, executable files, database files, disc files, compressed files, and audio files, among others. For example, the files may be received as .aif, .mp3, .wav, .rar, .zip, .z, .bin, .dmg, .iso, .csv, .log, .dat, .sql, .xml, .css, .html, .php, .xhtml, .txt, .doc, .rtf, .pdf, .xls, or .ods.

The files may also be associated with one or more accounts. All files associated with a single account may come from the same source or they may come from different sources. Each file includes a metadata tag that links the file to an account. Smart transmission system 100 uses these metadata tags to sort through the data stream 102 and gather information for an overall account profile.

As server 110 begins receiving the data stream 102, the processor 112 initiates step 204 of method 200, wherein the processor 112 assigns priority values for each account using priority engine 118. The priority engine 118 utilizes a priority value assignment rules table 128 to assign priority values to a set of static and dynamic factors related to a file or a set of files associated with an account. FIG. 3 provides an example of a CRM priority value assignment rules table 300 that can be used at step 204 of method 200 when the target application 106 is a CRM application and when smart transmission system 100 is configured to analyze the data stream 102 on an account-by-account basis.

In this example, the set of static factors 302 with rules for assigning priority values are the source of data 304, the customer type 306, the customer contact info 308, the customer opt-out consent 310 and the customer relationship age 312. For the source of data 304, an account is assigned a priority value of 1 if the files associated with the account are received from a global data platform process (GDPP); an account is assigned a priority value of 2 if the files associated with the account are received from a target list platform (TLP); and an account is assigned a priority value of 3 if the files associated with the account are received from some other source.

For the customer type 306, an account is assigned a priority value of 1 if the files are associated with the account of a prospect. An account is assigned a priority value of 2 if the files are associated with the account of a small business. An account is assigned a priority value of 3 if the files are associated the account of a client.

For the customer contact info 308, an account is assigned a priority value of 1 if the files associated with an account contain a phone number for that customer. An account is assigned a priority value of 2 if the files associated with an account contain an email for that customer. An account is assigned a priority value of 3 if the files associated with an account contain an address for that customer. An account is assigned a priority value of 4 if the files associated with an account contain some other form of contact for that customer.

For the customer opt out consent 310, an account is assigned a priority value of 1 if files are associated with an account for which the customer is callable. An account is assigned a priority value of 2 if the files are associated with an account for which the customer is mailable. An account is assigned a priority value of 3 if the files are associated with an account for which the customer is addressable. An account is assigned a priority value of 4 if the files are associated with an account for which the customer has some other status for whether to contact them.

For the customer relationship age 312, an account is assigned a priority value of 1 if the files are associated with an account that is a customer of 1-5 years. An account is assigned a priority value of 2 if the files are associated with an account that is a customer of 5-10 years. An account is assigned a priority value of 3 if the files are associated with an account that is a customer of 10-20 years. An account is assigned a priority value of 4 if the files are associated with an account that is a customer for some other period.

The dynamic factors 314 with rules for assigning priority values are the opportunity create date 316, the appointment due date 318, the follow-up task due date 320, the interaction created date 322, and the customer behavior indicator 324. For the opportunity create date 316, an account is assigned a priority value of 1 if the files associated with the account have an opportunity create date that is 1-2 days old. An account is assigned a priority value of 2 if the files associated with the account have an opportunity create date that is 3-5 days old. An account is assigned a priority value of 3 if the files associated with the account have an opportunity create date that is 6-10 days old. An account is assigned a priority value of 4 if the files associated with the account have an opportunity create date of some other age.

For the appointment due date 318, an account is assigned a priority value of 1 if the files associated with the account have an appointment due date that is 1-2 days old. An account is assigned a priority value of 2 if the files associated with the account have an appointment due date that is 3-5 days old. An account is assigned a priority value of 3 if the files associated with the account have an appointment due date that is 6-10 days old. An account is assigned a priority value of 4 if the files associated with the account have an appointment due date that is of some other age.

For the follow-up task due date 320, an account is assigned a priority value of 1 if the files associated with the account have a follow-up task due date that is 1-2 days old. An account is assigned a priority value of 2 if the files associated with the account have a follow-up task due date that is 3-5 days old. An account is assigned a priority value of 3 if the files associated with the account have a follow-up task due date that is 6-10 days old. An account is assigned a priority value of 4 if the files associated with the account have a follow-up task due date that is of some other age.

For the interaction created date 322, an account is assigned a priority value of 1 if the interaction created date for the files associated with the account is 1-2 days old. An account is assigned a priority value of 2 if the interaction created date for the files associated with the account is 3-5 days old. An account is assigned a priority value of 3 if the interaction created date for the files associated with the account is 6-10 days old. An account is assigned a priority value of 4 if the interaction created date for the files associated with the account is some other age.

For the customer behavior indicator 324, an account is assigned a priority value of 4 if there is a positive indicator of customer behavior. For example, a customer that uses the services of a user of smart transmission system 100 following contact from the user provides a positive indicator of customer behavior.

Alternate embodiments may contain different static factors 302 or dynamic factors 314. While the files in FIG. 4B include static factors 302 in the metadata, alternate embodiments may only contain dynamic factors 314. Additionally, file metadata and any account settings 130 may contain a greater number of factors than those depicted in FIGS. 4A-B. Method 200 only requires an analysis of a subset of those static factors 302 and dynamic factors 314 present for a given account.

Returning to step 204 of FIG. 2, a subset of the rules in CRM priority value assignment rules table 300 are applied to the factors read for each account through the implementation of priority engine 118 on a processor 112. FIG. 4A illustrates reading static factors 302 from account settings 400, an embodiment of the account settings 130, stored in memory 126. The static factors 302 are generally info related to the file or account that is generated when a file is created or updated for an account after the file is created. Updates to account settings can be done manually by a user of smart transmission system 100 or automatically via internet updates. In this example, accounts A33333 and A11111 are configured with a customer type 306, a customer contact info 308, and a customer opt out consent 310, and a customer relationship age 312.

Figure 4B:
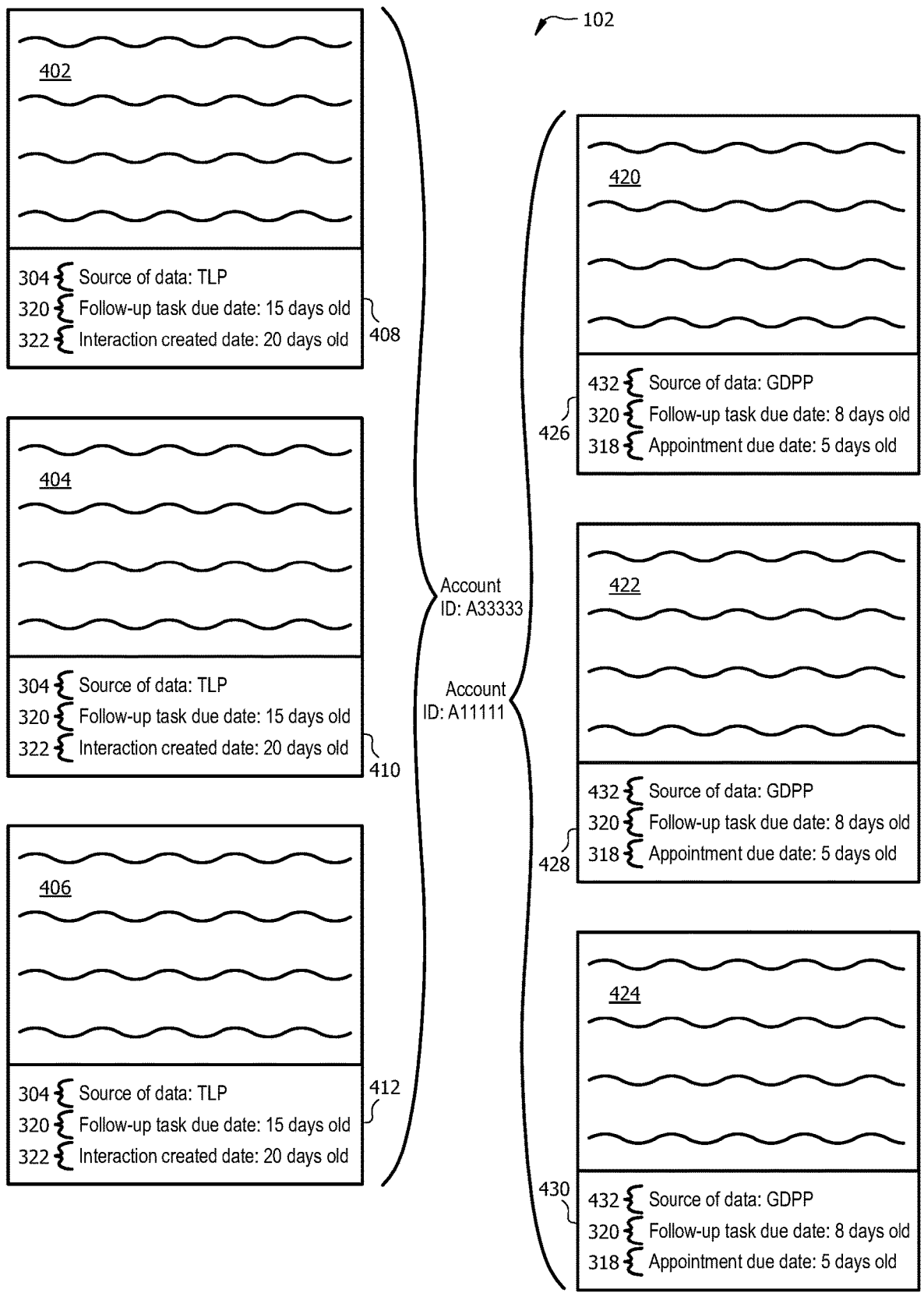

FIG. 4B illustrates reading static factors 302 and dynamic factors 314 from metadata associated with each file. Account A33333 has associated files 402, 404, and 406. These files contain metadata 408, 410, and 412, respectively. In this embodiment, the metadata in files linked to account A33333 include a source of data 304, a follow-up task due date 320, and an interaction created date 322. Account A11111 has associated files 420, 422, and 424. These files contain metadata 426, 428, and 430, respectively. In this embodiment, the metadata in files linked to account A11111 includes a source of data 304, a follow-up task due date 320, and an appointment due date 318.

Referring now to FIG. 5, tables 502 and 504 illustrate a subset that can be used when the target application 106 is a CRM. Table 502 shows the assignment of priority values for account A33333 and table 504 shows the assignment of priority values for account A11111. The factors that will be assigned priority values in this embodiment include a source of data 304, a customer type 306, a customer relationship age, and a follow-up task due date 320. Users can select different combinations of static factors 302 and dynamic factors 314 to suit their needs in the CRM application. FIG. 5 illustrates that users can select to evaluate more static factors 302 than dynamic factors 314, but the inverse is also possible depending on the preferences of the user.

The priority values are computed by comparing the factors in FIGS. 4A-B to the rules in CRM priority value assignment rules table 300. Because the source of data 304 for account A33333 is the TLP, it is assigned a priority value of 2. Because the source of data 304 for account A11111 is the GDPP, it is assigned a priority value of 1. Because the customer type 306 for account A33333 is a client, it is assigned a priority value of 3. Because the customer type 306 for account A11111 is a small business, it is assigned a priority value of 2. Because the customer relationship age 312 for account A33333 is 4 years, it is assigned a priority value of 1. Because the customer relationship age 312 for account A11111 is 15, it is assigned a priority value of 3. Because the follow-up task due date 320 for account A33333 is 15 days old, it is assigned a priority value of 4. Because the follow-up task due date 320 for account A11111 is 8 days old, it is assigned a priority value of 3.

While in the context of a CRM application the procedure of assigning priority values at step 204 is done on an account-by-account basis, smart transmission system 100 can support the assignment of priority values on a file-by-file basis for other types of target application 106. The procedure is largely the same for both methods. The difference is that assigning priority values on a file-by-file basis is done by assessing the set of dynamic factors 314 and static factors 302 within each file rather than across a set of files associated with an account.

Returning to FIG. 2, method 200 advances to step 206 where a cumulative priority value is computed for each account or file once the priority values are assigned for each account or for each file. The aggregation engine 120 of smart transmission system 100 is operably configured to compute the cumulative priority values using a priority algorithm. One possible statistical equation that can serve as the priority algorithm is a Gini Index.

FIG. 5 illustrates how a Gini Index can be used to calculate cumulative priority values based on the priority values assigned at step 204. Tables 502 and 504 include the static factors 302 and dynamic factors 314 that will be used to compute a Gini Index for accounts A33333 and A11111, respectively.

The Gini Index for each account is calculated using the following general formula: $GI = 1 - (A/T)^2 - (B/T)^2 - (N/T)^2$, where GI is the Gini Index; A is a first dynamic or static factor's priority value; B is a second dynamic or static factor's priority value; N is an nth dynamic or static factor's priority value; and T is the sum of the priority values of all the static factors 302 and dynamic factors 314 considered. For account A33333 the sum of the priority values is 10.

Plugging the priority values for the three static factors 302 and lone dynamic factor 314 in table 502 into the Gini Index equation result in a cumulative priority value 506 of 0.70. For account A11111 the sum of the priority values is 9. Plugging the priority values for the three static factors 302 and lone dynamic factor 314 in table 504 into the Gini Index equation results in a cumulative priority value 508 of 0.75. Accounts with a higher cumulative priority value have their associated files sent to the target application 106 before the files of an account having a lower cumulative priority value.

Figure 6:
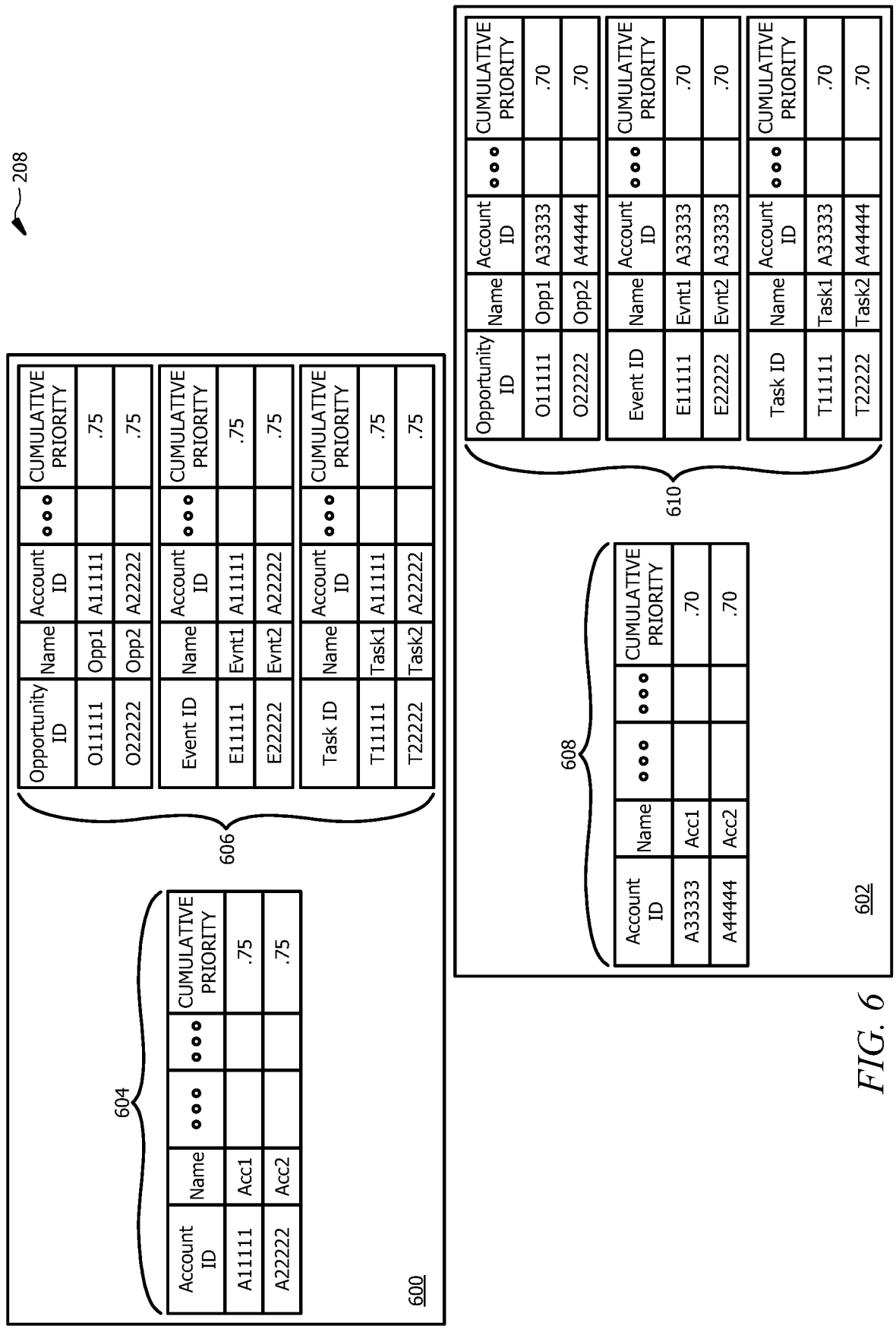
FIG. 6 illustrates the clustering step shown in FIG. 2 using a Customer Relationship Management application.

Returning to FIG. 2, method 200 proceeds to step 208, which involves clustering accounts and files with the same cumulative priority in tranches. The cluster engine 122 of smart transmission system 100 is operably configured to sort accounts based on the cumulative priority values calculated at step 206. FIG. 6 illustrates the separation of accounts into tranches and the linking of dependent files with their associated accounts. Tranche 600 represents the accounts with the highest cumulative priority and tranche 602 represents the accounts with the second highest priority. Account A11111 is placed in tranche 600 by cluster engine 122 while account A33333 is placed into tranche 602 because account A11111 has a cumulative priority value 508 of 0.75 and account A33333 has a cumulative priority value 506 of 0.70. Account A22222 is placed with account A11111 in tranche 600 because they have the same cumulative priority. Account A44444 is placed with account A33333 in tranche 602 because they have the same cumulative priority.

Step 208 also involves retrieving the files associated with each account and packaging them into the account's tranche. In FIG. 6 this means that for the set of account 604, cluster engine 122 will search for a set dependent files 606 associated with the respective accounts and add them to tranches 600. Dependent files 606 include an opportunity, an event, and a task for accounts A11111 and A22222. The same process occurs for tranches of lower priority. For the set of accounts 608, cluster engine 122 will search for a set of dependent files 610 associated with the respective accounts and add them to tranche 602. Dependent files 610 include an opportunity, an event, and a task for accounts A33333 and A44444. Step 208 repeats in this manner until each of the accounts associated with files received in step 202 are sorted into tranches and the data files received in step 202 are sorted into the tranches with their associated accounts.

Returning to FIG. 2, the tranches established in step 208 are transmitted to the target application 106—a CRM application in the present example—in order of priority. In FIG. 6 this means that tranche 600 is the first tranche of data transmitted from smart transmission system 100 to the target application 106 by cloud connector 124. While this tranche is transmitted to the target application 106, tranche 602 is stored in memory 126 of smart transmission system 100. Once tranche 600 is successfully uploaded to the target application 106, cloud connector 124 will retrieve tranche 602 from memory 126 and transmit tranche 602 to the target application 106. The process reiterates from the tranche of highest priority to the tranche of lowest priority. When the tranche of the lowest priority is successfully uploaded to target application 106, method 200 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for clustered data uploads, comprising:
 a memory configured to store a database of account settings, wherein the account settings includes at least one static factor related to data significance;
 a processor, communicatively coupled to a cloud server, the processor configured to:
   receive a data stream from a plurality of sources, wherein the data stream is composed of a plurality of files and each file in the data stream is associated with one of a plurality of accounts;
   implement a priority engine, configured to:
     read, for each of the plurality of accounts that has a related file in the data stream, a set of static factors related to the file's significance to a target application and a set of dynamic factors related to file usage and associated account updates, wherein the static and dynamic factors are located in metadata of the files associated with each account or in the database of account settings;
     for a first account comprised of a first set of files, assign:
       a priority value for each of a set of the static factors; and
       a priority value for each of a set of the dynamic factors;
     for a second account comprised of a second set of files, assign:
       a priority value for each of the set of static factors; and
       a priority value for each of the set of the dynamic factors;
   implement an aggregation engine, configured to compute, using a priority algorithm:
     a first cumulative priority value for the first account based on the priority values generated by the priority engine; and
     a second cumulative priority value for the second account based on the priority values generated by the priority engine, wherein the second cumulative priority value is greater than the first cumulative priority value;
   implement a data clustering engine, configured to:

assemble a first tranche, wherein the first tranche includes the second account and the files from the data stream that are associated with the second account;
assemble a second tranche, wherein the second tranche includes the first account and the files from the data stream that are associated with the first account;
implement a cloud connector engine, configured to:
connect with a target application located in the cloud server;
send, to the target application, the first tranche;
send, after the first tranche is uploaded to the target application, the second tranche to the target application.

2. The system of claim 1, wherein the memory is further configured to store a table of rules for assigning priority values, and wherein assigning priority values comprises comparing the static and dynamic factors associated with an account to a set of rules for assigning priority values for each factor.

3. The system of claim 1, wherein the account settings include at least one selected from the group of data source, customer type, customer contact info, customer opt out consent, and customer relationship.

4. The system of claim 1, wherein the target application is a customer relationship management application.

5. The system of claim 1, wherein the static factors include at least one selected from the group of data source, customer type, customer contact info, customer opt out consent, and customer relationship.

6. The system of claim 1, wherein the dynamic factors include at least one selected from the group of opportunity create date, appointment due date, follow-up task due date, interaction created date, and customer behavior indicator.

7. The system of claim 1, wherein the priority algorithm is a Gini Index formula.

8. A method for clustered data uploads, comprising:
reading for each of a plurality of accounts that has a related file in a data stream, by a first processor, a set of static factors related to the file's significance to a target application and a set of dynamic factors related to file usage and associated account updates, wherein the static and dynamic factors are located in metadata of the files associated with each account or in a database of account settings;
for a first account comprised of a first set of files, assigning, by the first processor:
a priority value for each of a set of the static factors; and
a priority value for each of a set of the dynamic factors;
for a second account comprised of a second set of files, assigning, by the first processor:
a priority value for each of the set of static factors; and
a priority value for each of the set of the dynamic factors;
computing, using a priority algorithm implemented on the first processor:
a first cumulative priority value for the first account; and
a second cumulative priority value for the second account, wherein the second cumulative priority value is greater than the first cumulative priority value;
assemble, by the first processor:
a first tranche, wherein the first tranche includes the second account and the files from the data stream that are associated with the second account; and
a second tranche, wherein the second tranche includes the first account and the files from the data stream that are associated with the first account;
send, by the first processor:
the first tranche to the target application located in a cloud server; and
after the first tranche is uploaded to the target application, the second tranche to the target application.

9. The method of claim 8, wherein the account settings include at least one selected from the group of data source, customer type, customer contact info, customer opt out consent, and customer relationship.

10. The method of claim 8, wherein assigning priority values comprises comparing the static and dynamic factors associated with an account to a set of rules for assigning priority values for each factor.

11. The method of claim 8, wherein the target application is a customer relationship management application.

12. The method of claim 8, wherein the static factors include at least one selected from the group of data source, customer type, customer contact info, customer opt out consent, and customer relationship.

13. The method of claim 8, wherein the dynamic factors include at least one selected from the group of opportunity create date, appointment due date, follow-up task due date, interaction created date, and customer behavior indicator.

14. The method of claim 8, wherein the priority algorithm is a Gini Index formula.

15. A data clustering device, comprising one or more processors configured to implement:
a priority engine, configured to:
read in the files' metadata, for each of the plurality of accounts that has a related file in the data stream, a set of static factors related to the file's significance to a target application and a set of dynamic factors related to file usage and associated account updates;
for a first account comprised of a first set of files, assign:
a priority value for each of a set of the static factors; and
a priority value for each of a set of the dynamic factors;
for a second account comprised of a second set of files, assign:
a priority value for each of the set of static factors; and
a priority value for each of the set of the dynamic factors;
an aggregation engine, configured to compute, using a priority algorithm:
a first cumulative priority value for the first account based on the priority values generated by the priority engine; and
a second cumulative priority value for the second account based on the priority values generated by the priority engine, wherein the second cumulative priority value is greater than the first cumulative priority value;
a data clustering engine, configured to:
assemble a first tranche, wherein the first tranche includes the second account and the files from the data stream that are associated with the second account;
assemble a second tranche, wherein the second tranche includes the first account and the files from the data stream that are associated with the first account;
a cloud connector engine, configured to:

connect with a target application located in the cloud server;

send, to the target application, the first tranche;

send, after the first tranche is uploaded to the target application, the second tranche to the target application.

16. The device of claim 15, wherein the priority engine is further operably configured to determine the set of static factors based on a database of account settings, wherein the account settings include at least one selected from the group of data source, customer type, customer contact info, customer opt out consent, and customer relationship.

17. The device of claim 15, wherein assigning priority values comprises comparing the static and dynamic factors associated with an account to a set of rules for assigning priority values.

18. The device of claim 15, wherein the dynamic factors include at least one selected from the group of opportunity create date, appointment due date, follow-up task due date, interaction created date, and customer behavior indicator.

19. The device of claim 15, wherein the priority algorithm is a Gini Index formula.

20. The device of claim 15, wherein the target application is a customer relationship management application.

* * * * *